United States Patent
Gong et al.

(10) Patent No.: US 8,687,611 B2
(45) Date of Patent: Apr. 1, 2014

(54) METHODS AND APPARATUS FOR WEIGHTED QUEUING IN DL MU MIMO

(75) Inventors: Michelle X. Gong, Sunnyvale, CA (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 625 days.

(21) Appl. No.: 12/655,026

(22) Filed: Dec. 22, 2009

(65) Prior Publication Data

US 2011/0149881 A1    Jun. 23, 2011

(51) Int. Cl.
*H04W 4/00* (2009.01)

(52) U.S. Cl.
USPC .......................................................... 370/338

(58) Field of Classification Search
USPC ................................ 370/335–338, 342–348; 455/422.1–423, 426.2, 450–452.2, 455/507–513, 561–562; 375/146–147, 375/219–220
See application file for complete search history.

(56) References Cited

U.S. PATENT DOCUMENTS

| | | | | |
|---|---|---|---|---|
| 8,045,574 | B2 * | 10/2011 | Sherman et al. | 370/445 |
| 2005/0135284 | A1 * | 6/2005 | Nanda et al. | 370/294 |
| 2005/0135403 | A1 * | 6/2005 | Ketchum et al. | 370/437 |
| 2006/0165036 | A1 | 7/2006 | Chandra et al. | |
| 2007/0070964 | A1 | 3/2007 | Jang | |
| 2009/0042596 | A1 * | 2/2009 | Yavuz et al. | 455/522 |
| 2009/0239486 | A1 | 9/2009 | Sugar et al. | |

FOREIGN PATENT DOCUMENTS

| | | |
|---|---|---|
| JP | 2003-008642 A | 1/2003 |
| WO | 2004/075569 A2 | 9/2004 |
| WO | 2007/091836 A1 | 8/2007 |
| WO | 2009/029770 A1 | 3/2009 |
| WO | 2011087593 A2 | 7/2011 |
| WO | 2011087593 A3 | 10/2011 |

OTHER PUBLICATIONS

International Search Report and Written Opinion received for PCT Patent Application No. PCT/US2010/058241, Aug. 31, 2011, 9 pages.
Office Action for Chinese Patent Application No. 201010620008.X, Mailed on Mar. 29, 2013, 6 pages of English Translation and 7 Pages Chinese of Office Action including Search Report.
Office Action for Japanese Patent Application No. 2012-545980, mailed on Jul. 30, 2013, 2 pages of English Translation and 3 pages of Japanese Office Action.
International Preliminary Report on Patentability and Written Opinion for PCT Patent Application No. PCT/US2010/058241, mailed on Jul. 5, 2012, 6 pages.

\* cited by examiner

*Primary Examiner* — Thai Hoang
(74) *Attorney, Agent, or Firm* — Forefront IP Lawgroup, PLLC

(57) ABSTRACT

Embodiment and methods and means for scheduling an access point (AP) traffic for multiple stations (STAs) in a downlink multiple-user multiple-input-multiple-output (MIMO) network transmission are provided for employing a weighted queuing mechanism.

20 Claims, 3 Drawing Sheets

METHODS AND APPARATUS FOR WEIGHTED QUEUING IN DL MU MIMO

BACKGROUND

A multiple-input-multiple-output (MIMO) wireless network is a communication system that generally includes an access point (AP) having multiple antennas communicatively coupled to multiple receiving stations (STA). To support downlink multi-user downlink MIMO network, the access point (AP) may need to schedule multiple packets destined for the multiple stations for simultaneous transmission. Existing IEEE 802.11 standards do not support downlink multi-user MIMO. As such, current access points (AP) choose the first packet or the first aggregate packet in the access point (AP) queue for transmission.

In current IEEE 802.11 stations (STA) implementation, packets are pushed into first-in-first-out (FIFO) queues sequentially. The first packet in each access category (AC) queue participates in an internal contention. The winner of the internal contention then goes on to participate in external contention. There is no mechanism provided in the IEEE 802.11 standard to support downlink spatial division multiple access (SDMA), where the access point (AP) needs to choose multiple packets to transmit simultaneously.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
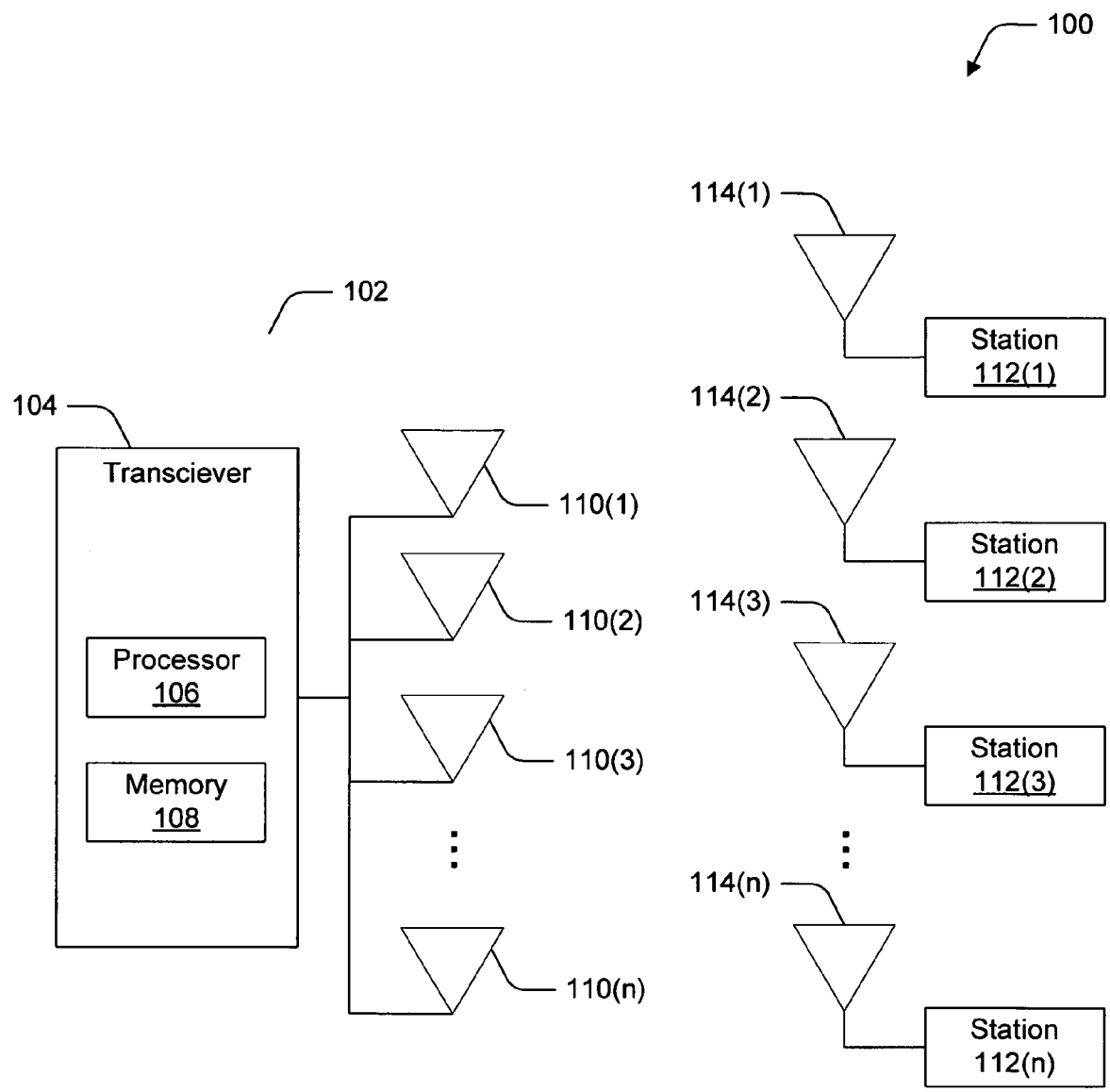
FIG. 1 is a block diagram of an embodiment of a wireless multi-user multiple-input-multiple-output network comprising an access point having multiple antennas and a plurality of stations.

In accordance with common practice, the various described features are not drawn to scale but are drawn to emphasize specific features relevant to the present specification. Reference characters denote like elements throughout Figures and text.

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

In the following discussion, an exemplary environment is first described that is operable to employ a weighted queuing mechanism to improve the performance of a downlink multi-user multiple-input-multiple-output (MIMO) network. Exemplary devices and procedures are then described that may be employed in the exemplary environment, as well as in other environments.

Exemplary Embodiment

FIG. 1 illustrates an exemplary implementation of an environment 100 that is operable to employ a weighted queuing mechanism to improve the performance of a downlink multi-user multiple-input-multiple-output (MIMO) network. The environment 100 is depicted as having an access point (AP) 102 which includes a transceiver 104. The transceiver 104 includes in part a processor 106 and a memory 108. The access point 102 further includes a plurality of antennas 110 (1)-110(n) (where the integer n represents any number of antennas). As depicted, the access point 102 includes four antennas 110(1), 110(2), 110(3) and 110(n). In other embodiments, different numbers of antennas may be used.

The processor core 106 represents a processing unit of any type of architecture which has the primary logic, operation devices, controllers, memory systems, and so forth of the access point 102. For instance the processor core 106 may incorporate one or more processing devices and a chipset having functionality for memory control, input/output control, graphics processing, and so forth.

The processor core 106 may further be coupled via a memory bus (not shown) to a memory 108 which in an embodiment represents "main" memory of the access point (AP) 102 and which may be utilized to store and/or execute system code and data. Memory 108 may be implemented with dynamic random access memory (DRAM), static random access memory (SRAM), or any other type of memories including those that do not need to be refreshed.

Memory 108 may also include other storage devices. These other memory devices include removable media drives (for example, CD/DVD drives), card readers, flash memory and so forth. The memory 108 may be connected to the processor core 106 in a variety of ways such as via Integrated Drive Electronics (IDE), Advanced Technology Attachment (ATA), Serial ATA (SATA), Universal Serial Bus (USB), and so forth. The memory 108 stores a variety of application modules (not shown) which may be executed via the processing core 106 and memory 108 to provide a variety of functionality to the access point 102.

FIG. 1 further illustrates the environment 100 as including a plurality of stations (STA) 112. As depicted, the environment 100 includes four independent stations 112(1), 112(2), 112(3) and 112(n). Each station 112 includes an antenna 114. In an alternative embodiment, each station 112 may have a plurality of antennas 114. It is further contemplated that the environment 100 may include a single station (STA) 112 that includes a plurality of antennas 114 that matches the number of antennas 110 included with the access point.

Each antenna 110 of the access point 102 may transmit a unique signal to a specific station 112 antenna 114 or the access point can multiplex data packets intended for a specific station 112. Multiplexing refers to the process by which a signal is split up into a plurality of signals and combined into one signal. Once a data packet is multiplexed into a plurality of signals, the access point 102 can transmit the plurality of signals.

To support downlink multiple-user MIMO, scheduling mechanisms are need at the access point (AP) 102 because rather than just transmitting the first packet in the queue, the access point (AP) 102 needs to choose multiple packets that are destined for different stations (STA's) to transmit. As such the current enhanced distribution channel access (EDCA) (as defined by IEEE 802.11) mechanism should extended.

The IEEE 802.11 Enhanced Distributed Channel Access (EDCA) is a quality-of-service (QoS) extension of the IEEE 802.11 Distributed Coordination Function (DCF). The major enhancement to support QoS is that the EDCA differentiates packets using different priorities and maps them to specific access categories (AC) that are buffered in separate queues at an access point or station. Each access category (AC) within an access point/station having its own EDCA parameters contends for the channel independently of the others. Each access category within the access point is assigned a priority based upon its parameters.

To extend the mechanism for scheduling transmissions, an access point (AP) can maintain and update an internal weight counter for each associated station (STA). This internal weight counter per station (STA) is denoted as WC[STA][AC]. The internal weight counter per station is used due to differences in topologies and locations, since one station (STA) may experience packet collisions while other stations (STA) may not. This is analogous to the case that the transmit data rates associated with individual stations (STA) are individually recorded and updated.

Similarly, the access point (AP) also maintains a Station (STA) Short Retry Count (SSRC) per station (STA) denoted as SSRC[STA][AC] and a Station (STA) Long Retry Count (SLRC) per station (STA) denoted as SLRC[STA][AC].

The access point (AP) 102 also maintains one channel access timer per access category (AC). This access timer is denoted as CW[AC]. CW[AC] is the contention window defined in the IEEE 802.11 standard.

Figure 2:
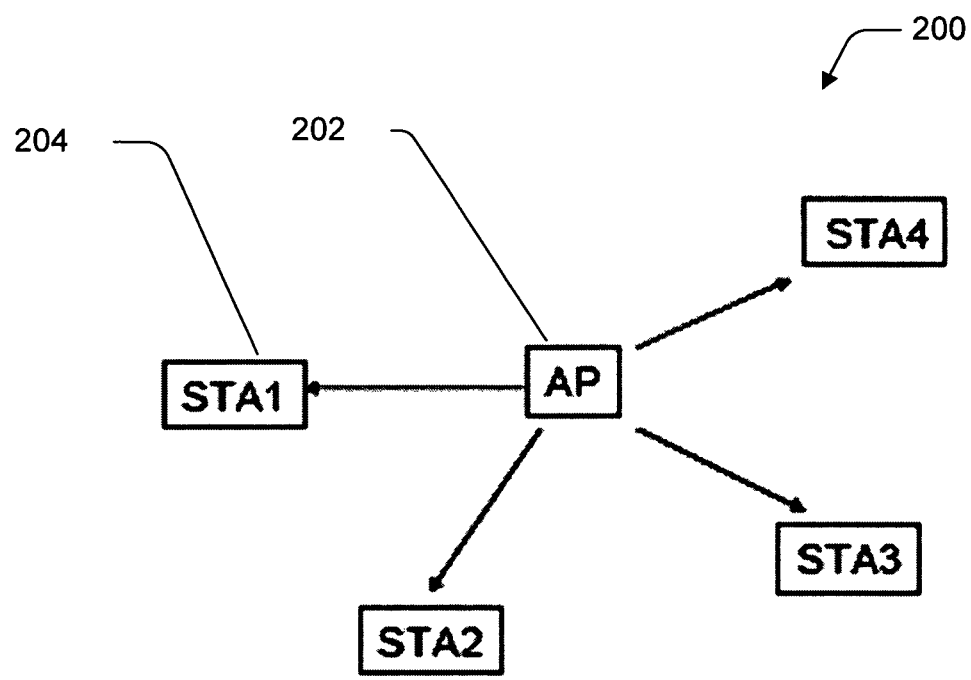
FIG. 2 is a block diagram of an embodiment of a wireless multi-user multiple-input-multiple-output network comprising an access point and a plurality of stations.

Basic Service Set (BSS) is illustrated in FIG. 2. If the spatial division multiple access (SDMA) transmission is not within a valid Transmission Opportunity (TXOP) and the access point (AP) 202 receives and Acknowledgement Packet (ACK) from one station (STA), i.e., STA1 204, it increments the internal weight counter for STA1: WC[STA][AC]=(WC[STA1][AC]+1)*2−1, if WC[STA1][AC]<$CW_{max}$[AC]. Additionally, either SSRC or SSLC is also incremented.

In one embodiment, the internal weight counter is not randomized. Instead, the WC[STA1][AC] takes an initial value of CWmin[AC]. At every retry, it is incremented until CWmax[AC] is reached.

In a second embodiment, the internal weight counter is randomized. In this case, another array, called random weight array RW[STA][AC] is defined. RW[STA1][AC] is a pseudo-random integer drawn from a uniform distribution over [0,WC[STA1][AC]]. The random weight array RW[STA1][AC] is decremented for every time slot that is sensed free. If no medium activity is indicated for the duration of a particular time slot, then the random weight array RW[STA1][AC] is decremented by one. If the medium is not free, the access point (AP) stops decrementing the random weight array RW[STA1][AC] until the medium is sensed free again.

The access point (AP) 202 may back off with access timer CW[AC]=$CW_{min}$[AC], if any transmission in the spatial division multiple access (SDMA) transmission is successful. If none of the transmission in the spatial division multiple access (SDMA) transmission is successful, the access point (AP) increments its CW[AC]: CW[AC]=(CW[AC]+1)*2−1, if CW[AC]<$CW_{max}$[AC].

$CW_{min}$[AC] comprises the minimum contention window for a particular access category [AC]. This parameter is input to an algorithm that determines the initial random backoff wait time (i.e., "window") of a transmission. The value specified in the Minimum Contention Window is the upper limit (typically in milliseconds) of a range from which the initial random backoff wait time is determined.

A first random number generated will be a number between 0 and the number specified for the Minimum Contention Window $CW_{min}$[AC]. If a transmission is unsuccessful, a retry counter is incremented and the random backoff value (window) is doubled. Doubling will continue for subsequent failed transmissions until the data transmission is successful or the size of the random backoff value reaches the number defined in the Maximum Contention Window. CW[AC] is reset to $CW_{min}$[AC] after a successful transmission. Valid values for the "CWmin" are 1, 3, 7, 15, 31, 63, 127, 255, 511, or 1024. The value for "CWmin" must be lower than the value for "CWmax".

CWmax represents the Maximum Contention Window. The value specified here in the Maximum Contention Window is the upper limit (in milliseconds) for the doubling of the random backoff value. This doubling continues until either the data frame is successfully transmitted or the Maximum Contention Window size is reached. Once the Maximum Contention Window size is reached, retries will continue for subsequent collisions until a maximum number of retries allowed is reached. Valid values for the "CWmax" are 1, 3, 7, 15, 31, 63, 127, 255, 511, or 1024. The value for "CWmax" must be higher than the value for "CWmin".

Pseudo-code for the process described above is shown below:

```
If success
{
    CW[AC] = CW_min[AC];
    For i = 1:n    //There are n packets in the SDMA transmission
    {
        WC[STAi][AC] = CW_min[AC];
        SSRC[STAi][AC] = 0;
        SLRC[STAi][AC] = 0;
    }
}
else
{
    For failed packets
    {
        If WC[STAi][AC] < CW_max[AC]
            WC[STAi][AC] = (WC[STAi]+1)*2-1;
        If (RTS/CTS is used)
        {
            if (SLRC[STAi][AC] != dot11LongRetryLimit)
                SSRC[STAi][AC]++;
            else
            {
                SSRC[STAi][AC] = 0;
                Drop the frame;
            }
        }
        else
        {
            If(SLRC[STA1][AC] != dot11LongRetryLimit)
                SLRC[STAi][AC]++;
            else
            {
                SLRC[STAi][AC] = 0;
                Drop the frame;
            }
        }
    }
    For successful packets
    {
        WC[STAi][AC] = 0;
        SSRC[STAi][AC] = 0;
        SLRC[STAi][AC] = 0;
    }
    If all packets failed
        CW[AC] = 2*(CW[AC]+1)-1;
    Else
        CW[AC] = CW_min[AC];
}
```

In one embodiment, before each transmission, the access point (AP) checks the internal weight counter and chooses packets from stations (STA's) that are in the same AC and are associated with the smallest weights. In another embodiment, before each transmission, the access point (AP) checks the internal weight counter and chooses packets from stations (STAs) that are in the same access category (AC) and are associated with zero weight.

Depending on the retry counters associated with the packet, the access point (AP) 202 may transmit the packet to STA1 204 in one of the following ways:

If SLRC[STA1][AC]≥1 and SSRC[STA1][AC]=0, meaning the packet has been retried using request to send/clear to send (RTS/CTS) protection, the access point (AP) 202 transmits a RTS to the station STA1 204 first. Upon receiving the CTS from station STA1 204, the access point transmits the data packets to multiple stations (STAs) including station STA1 204 simultaneously. RTS/CTS is an optional mechanism used by the IEEE 802.11 wireless networking protocol to reduce frame collisions.

A node wishing to send data initiates the process by sending a Request to Send frame (RTS). The destination node replies with a Clear to Send frame (CTS). Any other node receiving the RTS or CTS frame should refrain from sending data for a given time. The amount of time the node waits before trying to get access to the medium can be included in both the RTS and the CTS frame.

If SLRC[STA1][AC]≥1 and SSRC[STA1][AC]≥1, meaning that the packet has been retried using RTS/CTS protection, the access point (AP) lowers the data rate on the packet that is destined for station STA1.

If SLRC[STA1}[AC]=0 and SSRC[STA1][AC]=0, meaning it's a new packet and it has not been retired, the access point (AP) transmits the packet without Medium Access Control (MAC) protection.

Figure 3:
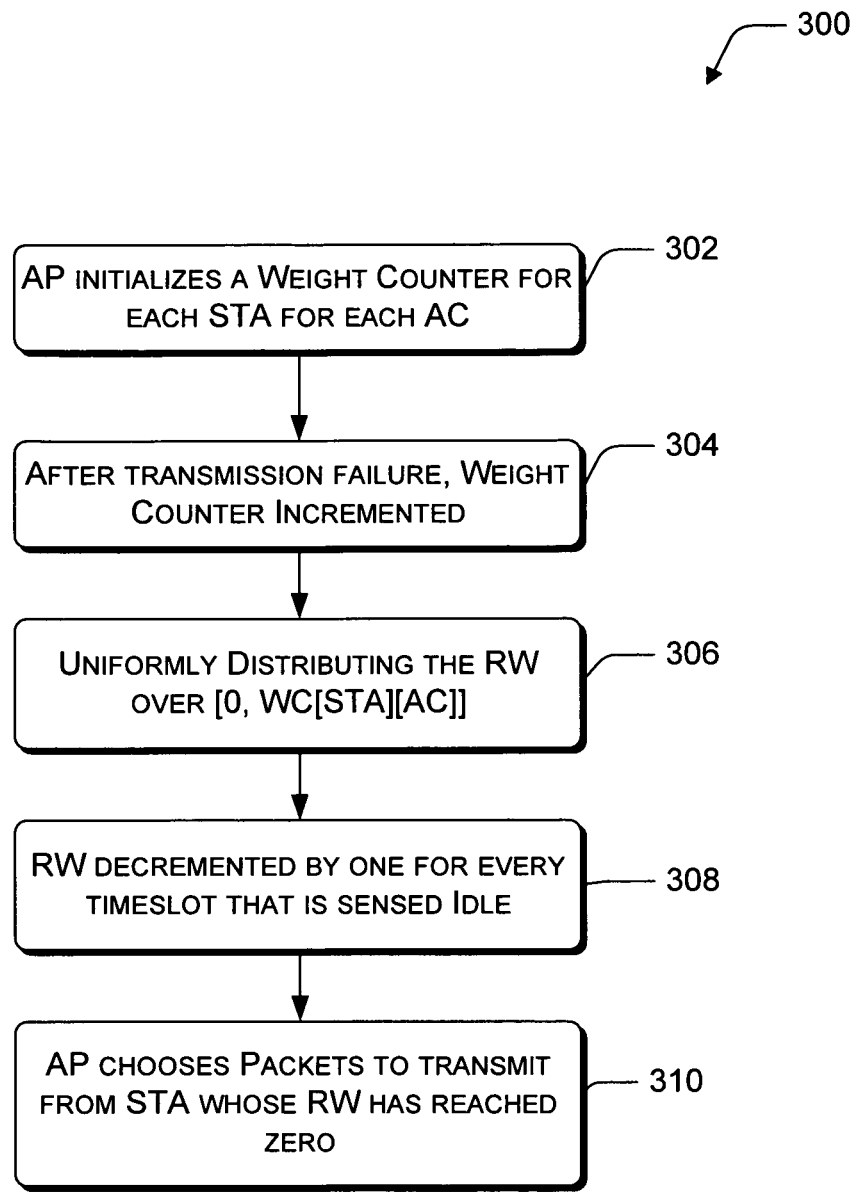
FIG. 3 is a flow diagram of an illustrative process for weighted queuing in a downlink multiple-user multiple-input-multiple-output network.

FIG. 3 depicts a flowchart that describes a method for scheduling packet delivery across a multiple-user MIMO network in accordance with one embodiment. In describing the method of flowchart 300, reference is made to the access point 102 of FIG. 1. It is to be understood, however, that the method of flowchart 300 is contemplated to be broadly applicable to a vast range of devices, and is not to be limited in its use only in connection with the exemplary embodiment of FIG. 1.

At step 302, an access point (AP) initializes a weight counter for each station (STA) per access category (AC). The weight counter WC[STA][AC] is initialized to the minimum contention window for an access category $CW_{min}[AC]$. The value specified in the Minimum Contention Window is the upper limit (typically in milliseconds) of a range from which the initial random backoff wait time is determined.

At step 304, after a transmission failure, the corresponding weight counter WC for the failed station is incremented. The weight counter WC[STA][AC] is incremented such that (WC[STA][AC]+1)*2−1.

At step 306, a random weight RW is uniformly distributed over [0, WC[STA][AC]).

At step 308, the random weight RW is decremented by one for every timeslot that is sensed idle.

At step 310, the access point chooses packets to transmit from stations (STA's) whose random weight has reached zero.

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

What is claimed is:

1. An apparatus for scheduling packet delivery across multiple-user multiple-input-multiple-output (MIMO) network, wherein the apparatus comprises:
   an access point (AP), wherein the access point (AP) maintains a weight counter for each station of a plurality of stations; wherein the access point (AP) further comprises:
   after a transmission failure, increments the weight counter WC[STA][AC]; and
   after a successful transmission, resets the weight counter WC[STA][AC] equal to a minimum contention window for an access category $CW_{min}[AC]$ for a corresponding station (STA);
   wherein the weight counter WC[STA][AC] is incremented such that:

$WC[STA][AC]=(WC[STA][AC]+1)\times 2-1.$

2. The apparatus of claim 1, wherein the access point (AP) maintains the weight counter by initializing the weight counter WC[STA][AC].

3. The apparatus of claim 2, wherein initializing the weight counter WC[STA][AC] comprises setting the weight counter WC[STA][AC] equal to a minimum contention window for an access category $CW_{min}[AC]$.

4. The apparatus of claim 1, wherein the access point (AP) maintains a station (STA) short retry count (SSRC) for each particular station.

5. The apparatus of claim 1, wherein the access point (AP) maintains a station (STA) long retry count (SLRC) for each particular station.

6. The apparatus of claim 1, wherein the access point (AP) checks an internal weight counter and chooses packets for particular stations (STAs) that are in the same access category (AC) and are associated with a smallest weight.

7. An apparatus for scheduling packet delivery across multiple-user multiple-input-multiple-output (MIMO) network, wherein the apparatus comprises:
   an access point (AP), wherein the access point (AP) maintains a weight counter for each station of a plurality of stations;
   wherein the access point (AP) further comprises maintaining a random weight (RW) per station (STA) per access category (AC);
   wherein the random weight (RW) is a pseudorandom integer drawn from a uniform distribution over [0, WC[STA][AC]].

8. The apparatus of claim 7, wherein the access point (AP) decrements random weight (RW) by one for every timeslot that is sensed idle.

9. The apparatus of claim 7, wherein the access point (AP) maintains a station (STA) short retry count (SSRC) for each particular station.

10. The apparatus of claim 7, wherein the access point (AP) maintains a station (STA) long retry count (SLRC) for each particular station.

11. The apparatus of claim 7, wherein the access point (AP) checks an internal weight counter and chooses packets for particular stations (STAs) that are in the same access category (AC) and are associated with a smallest weight.

12. The apparatus of claim 7, wherein the access point (AP) maintains the weight counter by initializing the weight counter WC[STA][AC].

13. The apparatus of claim 12, wherein initializing the weight counter WC[STA][AC] comprises setting the weight counter WC[STA][AC] equal to a minimum contention window for an access category $CW_{min}[AC]$.

14. A computer-implemented method for scheduling packet delivery across multiple-user multiple-input-multiple-output (MIMO) network, wherein the computer-implemented method comprises:
   maintaining, by an access point (AP), an internal weight counter for each particular associated station in the multiple-user MIMO network to schedule traffic destined for the associated stations in a downlink multiple-user MIMO transmission;
   maintaining, by the access point, a station (STA) short retry count (SSRC) for each particular station; and
   maintaining, by the access point, a station (STA) long retry count (SLRC) for each particular station;
   wherein the method further comprises:
   incrementing, by the access point (AP), after a transmission failure, the weight counter WC[STA][AC]; and
   resetting, by the access point, after a successful transmission, the weight counter WC[STA][AC] such that it is equal to a minimum contention window for an access category $CW_{min}[AC]$ for a corresponding station (STA);
   wherein the weight counter WC[STA][AC] is incremented such that:

$$WC[STA][AC]=(WC[STA][AC]+1)\times 2-1$$

if $$WC[STA][AC]<CW_{max}[AC];$$

wherein $CW_{max}[AC]$ comprises a Maximum Contention Window that represents an upper limit for the doubling of a random backoff value.

15. The method of claim 14, wherein maintaining the internal weight counter comprises initializing a weight counter WC[STA][AC].

16. The method of claim 15, wherein initializing the weight counter WC[STA][AC] comprises setting the weight counter WC[STA][AC] equal to a minimum contention window for an access category $CW_{min}[AC]$.

17. The method of claim 14, wherein the access point (AP) further comprises a random weight (RW).

18. One or more computer-readable storage memory storing instructions, that when executed by a processor, cause the processor to perform acts comprising:
   maintaining, by an access point (AP), an internal weight counter for each particular associated station in a multiple-user MIMO network to schedule traffic destined for the associated stations in a downlink multiple-user MIMO transmission;
   maintaining, by the access point, a station (STA) short retry count (SSRC) for each particular station; and
   maintaining, by the access point, a station (STA) long retry count (SLRC) for each particular station;
   wherein the access point (AP) further comprises:
   after a transmission failure, increments the weight counter WC[STA][AC]; and
   after a successful transmission, resets the weight counter WC[STA][AC] equal to a minimum contention window for an access category $CW_{min}[AC]$ for a corresponding station (STA);
   wherein the weight counter WC[STA][AC] is incremented such that:

$$WC[STA][AC]=(WC[STA][AC]+1)\times 2-1.$$

19. The one or more computer-readable storage memory of claim 18, wherein maintaining the internal weight counter comprises initializing a weight counter WC[STA][AC].

20. The one or more computer-readable storage memory of claim 19, wherein initializing the weight counter WC[STA][AC] comprises setting the weight counter WC[STA][AC] equal to a minimum contention window for an access category $CW_{min}[AC]$.

* * * * *

UNITED STATES PATENT AND TRADEMARK OFFICE
CERTIFICATE OF CORRECTION

| | | |
|---|---|---|
| PATENT NO. | : 8,687,611 B2 | Page 1 of 1 |
| APPLICATION NO. | : 12/655026 | |
| DATED | : April 1, 2014 | |
| INVENTOR(S) | : Michelle X. Gong et al. | |

It is certified that error appears in the above-identified patent and that said Letters Patent is hereby corrected as shown below:

In the Drawings:

On sheet 1 of 3, in Figure 1, Reference Numeral 104, line 1, delete "Transciever" and insert
-- Transceiver --, therefor.

In the Claims:

In column 6, line 40, in claim 3, delete "counterWC[STA][AC]" and insert
-- counter WC[STA][AC] --, therefor.

Signed and Sealed this
Seventeenth Day of June, 2014

Michelle K. Lee
*Deputy Director of the United States Patent and Trademark Office*